(12) United States Patent
Liu

(10) Patent No.: US 11,399,359 B2
(45) Date of Patent: Jul. 26, 2022

(54) METHOD AND DEVICE FOR EXTENDING PBCH

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 64 days.

(21) Appl. No.: 16/956,052

(22) PCT Filed: Dec. 20, 2017

(86) PCT No.: PCT/CN2017/117584
§ 371 (c)(1),
(2) Date: Jun. 19, 2020

(87) PCT Pub. No.: WO2019/119324
PCT Pub. Date: Jun. 27, 2019

(65) Prior Publication Data
US 2020/0413372 A1 Dec. 31, 2020

(51) Int. Cl.
*H04W 72/00* (2009.01)
*H04W 72/04* (2009.01)
*H04W 56/00* (2009.01)

(52) U.S. Cl.
CPC ....... *H04W 72/005* (2013.01); *H04W 56/001* (2013.01); *H04W 72/044* (2013.01)

(58) Field of Classification Search
CPC .... H04B 7/2615; H04B 7/216; H04B 7/0617; H01Q 3/2605; H04L 5/0007;
(Continued)

(56) References Cited

U.S. PATENT DOCUMENTS

2012/0270540 A1* 10/2012 Ode .................. H04W 48/12
455/426.1
2015/0009883 A1 1/2015 Bai et al.
(Continued)

FOREIGN PATENT DOCUMENTS

CN 102958133 A 3/2013
CN 103298090 A 9/2013
(Continued)

OTHER PUBLICATIONS

International Search Report in PCT/CN2017/117584 dated Sep. 12, 2018.
(Continued)

*Primary Examiner* — Yee F Lam
(74) *Attorney, Agent, or Firm* — Syncoda LLC; Feng Ma

(57) ABSTRACT

A method for extending a Physical Broadcast Channel (PBCH) can be applied to a base station. A synchronous broadcast block of a PBCH is provided with a PBCH extension bit. The method includes: when extension of a PBCH is required, activating a PBCH extension bit indication function, wherein a PBCH extension bit indicates whether there is PBCH extension information; when transmission of the PBCH extension information is required, setting the PBCH extension bit in a first synchronous broadcast block to be a first state to indicate PBCH extension information; transmitting the first synchronous broadcast block to a terminal; generating a PBCH extension block including the PBCH extension information; and transmitting the PBCH extension block at a set extension position, such that the terminal receives the PBCH extension block at the set extension position, and obtains the PBCH extension information from the PBCH extension block.

17 Claims, 8 Drawing Sheets

(58) Field of Classification Search
CPC ............. H04L 27/2613; H04L 27/2614; H04L 27/2662; H04L 1/0003; H04L 5/005; H04L 1/08; H04L 27/2692; H04L 5/0023; H04L 5/0051; H04J 1/065; H04J 11/003; H04J 2203/0091; H04W 72/005; H04W 72/044; H04W 72/042; H04W 48/12

See application file for complete search history.

(56) References Cited

U.S. PATENT DOCUMENTS

| | | | |
|---|---|---|---|
| 2017/0105166 A1* | 4/2017 | Lee | H04W 48/12 |
| 2017/0222771 A1* | 8/2017 | Chendamarai Kannan | H04L 5/0048 |
| 2017/0318559 A1* | 11/2017 | Islam | H04W 72/005 |
| 2017/0353254 A1* | 12/2017 | Islam | H04L 27/2662 |
| 2017/0353255 A1* | 12/2017 | Islam | H04B 7/2615 |
| 2017/0353256 A1* | 12/2017 | Islam | H04L 25/022 |
| 2017/0353257 A1* | 12/2017 | Islam | H04J 11/0079 |
| 2018/0098285 A1* | 4/2018 | Yu | H04W 4/70 |
| 2018/0212651 A1* | 7/2018 | Li | H04B 7/0686 |
| 2018/0302182 A1* | 10/2018 | Ly | H04L 27/2613 |
| 2019/0090256 A1* | 3/2019 | Liu | H04L 5/0094 |
| 2019/0149276 A1* | 5/2019 | Xiong | H04L 5/0048 370/329 |
| 2019/0173628 A1* | 6/2019 | Ko | H04L 5/0064 |
| 2019/0313428 A1* | 10/2019 | Zhou | H04W 48/12 |
| 2020/0107247 A1* | 4/2020 | Ioffe | H04W 4/70 |
| 2020/0259588 A1* | 8/2020 | Iyer | H04L 5/0048 |

FOREIGN PATENT DOCUMENTS

| | | |
|---|---|---|
| CN | 103458509 A | 12/2013 |
| CN | 105144819 A | 12/2015 |
| CN | 103298090 B | 4/2017 |
| WO | 2017196406 A1 | 11/2017 |

OTHER PUBLICATIONS

Extended European Search Report in Application No. 17935754.6, dated Oct. 23, 2020.

India 1st Office Action in Application No. 202027030644, dated Sep. 10, 2021.

* cited by examiner

METHOD AND DEVICE FOR EXTENDING PBCH

CROSS-REFERENCE TO RELATED APPLICATION

This application is a national stage of International Application No. PCT/CN2017/117584 filed on Dec. 20, 2017, the disclosure of which is hereby incorporated by reference in its entirety.

TECHNICAL FIELD

The present disclosure relates to the field of communication, and more particularly, to a method and device for extending a PBCH.

BACKGROUND

With the continuous development of communication technology, the necessity of extending a PBCH (Physical Broadcast Channel) is becoming stronger and stronger. However, there is no technical solution for extending the PBCH in the related art, which reduces the communication capability of PBCH.

SUMMARY

In order to overcome the problems in the related art, embodiments of the present disclosure provide a method and device for extending a PBCH.

According to a first aspect of the embodiments of the present disclosure, a method for extending a PBCH is provided. The method is used for a base station, and a synchronous broadcast block of the PBCH is provided with a PBCH extension bit. The method includes:

when extension of the PBCH is required, enabling an indication function for the PBCH extension bit, wherein the PBCH extension bit is configured to indicate whether there is PBCH extension information;

when sending of the PBCH extension information is required, setting a PBCH extension bit in a first synchronous broadcast block to be a first state, wherein the first state is configured to indicate that there is PBCH extension information;

sending the first synchronous broadcast block to a terminal, so that the terminal determines that there is the PBCH extension information according to the first state;

generating a PBCH extension block, wherein the PBCH extension block includes the PBCH extension information; and sending the PBCH extension block at a set extension position, so that the terminal receives the PBCH extension block at the set extension position, and obtains the PBCH extension information from the PBCH extension block.

In an embodiment, the first state is an activated state, and the activated state is configured to indicate that there is the PBCH extension information.

In an embodiment, the first state is a first value, and the first value is configured to indicate that there is the PBCH extension information.

In an embodiment, the synchronous broadcast block is a time-frequency resource block that carries a synchronous signal and broadcast information, and the PBCH extension block is a time-frequency resource block that does not carry the synchronous signal.

In an embodiment, the set extension position is a specified time domain position after the first synchronous broadcast block.

In an embodiment, the set extension position is a specified frequency domain position after the first synchronous broadcast block.

In an embodiment, the method further includes:

when the sending of the PBCH extension information is not required, setting a PBCH extension bit in a second synchronous broadcast block to be a second state, wherein the second state is configured to indicate that there is no PBCH extension information;

sending the second synchronous broadcast block to the terminal, so that the terminal determines that there is no PBCH extension information according to the second state.

In an embodiment, the second state is an inactive state, and the inactive state is configured to indicate that there is no PBCH extension information.

In an embodiment, the second state is a second value, and the second value is configured to indicate that there is no PBCH extension information.

In an embodiment, the method further includes:

when the extension of the PBCH is not required, disabling the indication function for the PBCH extension bit;

setting a PBCH extension bit in a third synchronous broadcast block to be a reserved state, wherein the reserved state is configured to indicate to ignore the PBCH extension bit;

sending the third synchronous broadcast block to the terminal, so that the terminal determines to ignore the PBCH extension bit according to the reserved state.

According to a second aspect of the embodiments of the present disclosure, a method for extending a PBCH is provided. The method is used for a terminal, and a synchronous broadcast block of the PBCH is provided with a PBCH extension bit. The method includes:

receiving a first synchronous broadcast block sent by a base station, wherein a PBCH extension bit in the first synchronous broadcast block is in a first state, and the first state is configured to indicate that there is PBCH extension information;

determining that there is the PBCH extension information according to the first state;

receiving a PBCH extension block sent by the base station at a set extension position, wherein the PBCH extension block includes the PBCH extension information;

obtaining the PBCH extension information from the PBCH extension block.

In an embodiment, the first state is an activated state, and the activated state is configured to indicate that there is the PBCH extension information.

In an embodiment, the first state is a first value, and the first value is configured to indicate that there is the PBCH extension information.

In an embodiment, the set extension position is a specified time domain position after the first synchronous broadcast block;

receiving a PBCH extension block sent by the base station at a set extension position includes:

receiving the PBCH extension block sent by the base station at the specified time domain position.

In an embodiment, the set extension position is a specified frequency domain position after the first synchronous broadcast block;

receiving a PBCH extension block sent by the base station at a set extension position includes:

receiving the PBCH extension block sent by the base station at the specified frequency domain position.

In an embodiment, the synchronous broadcast block is a time-frequency resource block that carries a synchronous signal and broadcast information, and the PBCH extension block is a time-frequency resource block that does not carry the synchronous signal.

In an embodiment, the method further includes:

receiving a second synchronous broadcast block sent by the base station, wherein a PBCH extension bit in the second synchronous broadcast block is in a second state, and the second state is configured to indicate that there is no PBCH extension information; and determining that there is no PBCH extension information according to the second state.

In an embodiment, the second state is an inactive state, and the inactive state is configured to indicate that there is no PBCH extension information.

In an embodiment, the second state is a second value, and the second value is configured to indicate that there is no PBCH extension information.

In an embodiment, the method further includes:

receiving a third synchronous broadcast block sent by the base station, wherein a PBCH extension bit in the third synchronous broadcast block is in a reserved state, and the reserved state is configured to indicate to ignore the PBCH extension bit; and ignoring the PBCH extension bit according to the reserved state.

According to a third aspect of the embodiments of the present disclosure, a device for extending a PBCH is provided. The device is used for a base station, and a synchronous broadcast block of the PBCH is provided with a PBCH extension bit. The device includes:

an enabling module, configured to enable an indication function for the PBCH extension bit when extension of the PBCH is required, wherein the PBCH extension bit is configured to indicate whether there is PBCH extension information;

a first setting module, configured to set a PBCH extension bit in a first synchronous broadcast block to be a first state when sending of the PBCH extension information is required, wherein the first state is configured to indicate that there is PBCH extension information;

a first sending module configured to send the first synchronous broadcast block to a terminal, so that the terminal determines that there is the PBCH extension information according to the first state;

a generating module, configured to generate a PBCH extension block, wherein the PBCH extension block includes the PBCH extension information; and a second sending module, configured to send the PBCH extension block at a set extension position, so that the terminal receives the PBCH extension block at the set extension position, and obtains the PBCH extension information from the PBCH extension block.

In an embodiment, the first state is an activated state, and the activated state is configured to indicate that there is the PBCH extension information.

In an embodiment, the first state is a first value, and the first value is configured to indicate that there is the PBCH extension information.

In an embodiment, the synchronous broadcast block is a time-frequency resource block that carries a synchronous signal and broadcast information, and the PBCH extension block is a time-frequency resource block that does not carry the synchronous signal.

In an embodiment, the set extension position is a specified time domain position after the first synchronous broadcast block.

In an embodiment, the set extension position is a specified frequency domain position after the first synchronous broadcast block.

In an embodiment, the device further includes:

a second setting module, configured to set a PBCH extension bit in a second synchronous broadcast block to be a second state when sending of the PBCH extension information is not required, wherein the second state is configured to indicate that there is no PBCH extension information;

a third sending module, configured to send the second synchronous broadcast block to the terminal, so that the terminal determines that there is no PBCH extension information according to the second state.

In an embodiment, the second state is an inactive state, and the inactive state is configured to indicate that there is no PBCH extension information.

In an embodiment, the second state is a second value, and the second value is configured to indicate that there is no PBCH extension information.

In an embodiment, the device further includes:

a disabling module, configured to disable the indication function for the PBCH extension bit, when the extension of the PBCH is not required;

a third setting module, configured to set a PBCH extension bit in a third synchronous broadcast block to be a reserved state, wherein the reserved state is configured to indicate to ignore the PBCH extension bit;

a fourth sending module, configured to send the third synchronous broadcast block to the terminal, so that the terminal determines to ignore the PBCH extension bit according to the reserved state.

According to a fourth aspect of the embodiments of the present disclosure, a device for extending a PBCH is provided. The device is used for a terminal, and a synchronous broadcast block of the PBCH is provided with a PBCH extension bit. The device includes:

a first receiving module, configured to receive a first synchronous broadcast block sent by a base station, wherein a PBCH extension bit in the first synchronous broadcast block is in a first state, and the first state is configured to indicate that there is PBCH extension information;

a first determining module, configured to determine that there is the PBCH extension information according to the first state;

a second receiving module, configured to receive a PBCH extension block sent by the base station at a set extension position, wherein the PBCH extension block includes the PBCH extension information;

an obtaining module, configured to obtain the PBCH extension information from the PBCH extension block.

In an embodiment, the first state is an activated state, and the activated state is configured to indicate that there is the PBCH extension information.

In an embodiment, the first state is a first value, and the first value is configured to indicate that there is the PBCH extension information.

In an embodiment, the set extension position is a specified time domain position after the first synchronous broadcast block; the second receiving module includes:

a first receiving sub-module, configured to receive the PBCH extension block sent by the base station at the specified time domain position.

In an embodiment, the set extension position is a specified frequency domain position after the first synchronous broadcast block; the second receiving module includes:

a second receiving sub-module, configured to receive the PBCH extension block sent by the base station at the specified frequency domain position.

In an embodiment, the synchronous broadcast block is a time-frequency resource block that carries a synchronous signal and broadcast information, and the PBCH extension block is a time-frequency resource block that does not carry the synchronous signal.

In an embodiment, the device further includes:

a third receiving module, configured to receive a second synchronous broadcast block sent by the base station, wherein a PBCH extension bit in the second synchronous broadcast block is in a second state, and the second state is configured to indicate that there is no PBCH extension information; and a second determining module, configured to determine that there is no PBCH extension information according to the second state.

In an embodiment, the second state is an inactive state, and the inactive state is configured to indicate that there is no PBCH extension information.

In an embodiment, the second state is a second value, and the second value is configured to indicate that there is no PBCH extension information.

In an embodiment, the device further includes:

a fourth receiving module, configured to receive a third synchronous broadcast block sent by the base station, wherein a PBCH extension bit in the third synchronous broadcast block is in a reserved state, and the reserved state is configured to indicate to ignore the PBCH extension bit; and a third determining module, configured to determine to ignore the PBCH extension bit according to the reserved state.

According to a fifth aspect of the embodiments of the present disclosure, a non-transitory computer-readable storage medium is provided. The storage medium stores computer instructions, and the computer program is configured to execute the method for extending the PBCH according to the first aspect.

According to a sixth aspect of the embodiments of the present disclosure, a non-transitory computer-readable storage medium is provided. The storage medium stores computer instructions, and the computer program is configured to execute the method for extending the PBCH according to the second aspect.

According to a seventh aspect of the embodiments of the present disclosure, a device for extending a PBCH is provided. The device is used for a base station, and a synchronous broadcast block of the PBCH is provided with a PBCH extension bit. The device includes:

a processor;

a memory for storing processor-executable instructions;

wherein the processor is configured to:

when extension of the PBCH is required, enable an indication function for the PBCH extension bit, wherein the PBCH extension bit is configured to indicate whether there is PBCH extension information;

when sending of the PBCH extension information is required, set a PBCH extension bit in a first synchronous broadcast block to be a first state, wherein the first state is configured to indicate that there is PBCH extension information;

send the first synchronous broadcast block to a terminal, so that the terminal determines that there is the PBCH extension information according to the first state;

generate a PBCH extension block, wherein the PBCH extension block includes the PBCH extension information; and send the PBCH extension block at a set extension position, so that the terminal receives the PBCH extension block at the set extension position, and obtains the PBCH extension information from the PBCH extension block.

According to an eighth aspect of the embodiments of the present disclosure, a device for extending a PBCH is provided, the device is used for a terminal, and a synchronous broadcast block of the PBCH is provided with a PBCH extension bit. The device includes:

a processor;

a memory for storing processor-executable instructions;

wherein the processor is configured to:

receive a first synchronous broadcast block sent by a base station, wherein a PBCH extension bit in the first synchronous broadcast block is in a first state, and the first state is configured to indicate that there is PBCH extension information;

determine that there is the PBCH extension information according to the first state;

receive a PBCH extension block sent by the base station at a set extension position, wherein the PBCH extension block includes the PBCH extension information; and obtain the PBCH extension information from the PBCH extension block.

The technical solutions provided by the embodiments of the present disclosure may include the following beneficial effects.

The base station in the present disclosure can enable the indication function for the PBCH extension bit when the extension of the PBCH is required, and the PBCH extension bit is configured to indicate whether there is PBCH extension information. When the sending of the PBCH extension information is required, the base station may set the PBCH extension bit in the first synchronous broadcast block to be the first state which is configured to indicate that there is PBCH extension information, and send the first synchronous broadcast block to the terminal, so that the terminal may determine that there is the PBCH extension information according to the first state. The PBCH extension block is generated, and the PBCH extension block includes the PBCH extension information. The PBCH extension block is sent at the set extension position, so that the terminal may receive the PBCH extension block at the set extension position, and obtain the PBCH extension information from the PBCH extension block, thereby achieving the function of extending the PBCH and improving the communication capability of the extended PBCH.

The terminal in the present disclosure may receive the first synchronous broadcast block sent by the base station. The PBCH extension bit in the first synchronous broadcast block is in the first state, and the first state is configured to indicate that there is the PBCH extension information. The terminal determines that there is the PBCH extension information according to the first state, and receives the PBCH extension block sent by the base station at the set extension position, and the PBCH extension block includes the PBCH extension information, thereby achieving the function of extending the PBCH and improving the communication capability of the extended PBCH.

It should be understood that the foregoing general description and the following detailed description are merely exemplary and explanatory and should not be construed as restrictive of the present disclosure.

BRIEF DESCRIPTION OF THE DRAWINGS

The accompanying drawings, which are incorporated in the specification and constitute a part of the specification, show embodiments of the present disclosure. The drawings along with the specification explain the principles of the present disclosure.

DETAILED DESCRIPTION

Figure 1:
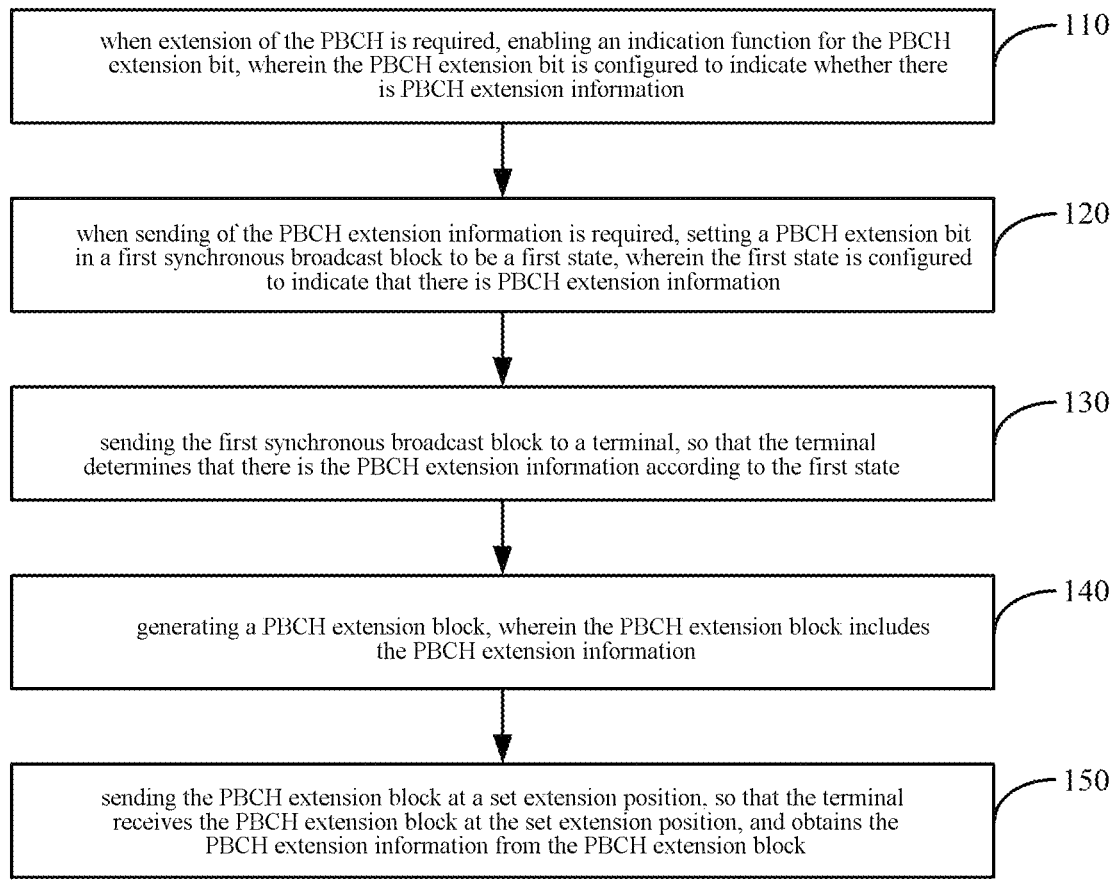
FIG. 1 is a flowchart showing a method for extending a PBCH according to an exemplary embodiment.

Exemplary embodiments will be described in detail herein, examples of which are illustrated in the accompanying drawings. The same number in different figures refers to the same or similar elements unless otherwise indicated. The implementations described in the following exemplary embodiments do not represent all implementations consistent with the present disclosure. Instead, they are merely examples of devices and methods consistent with aspects of the present disclosure as detailed in the appended claims.

The terms used in the present disclosure are merely for the purpose of describing particular embodiments and are not intended to limit the present disclosure. As used in the present disclosure and the appended claims, the singular forms "a," "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in the present disclosure to describe various information, such information should not be limited to these terms. These terms are only used to distinguish the same type of information from each other. For example, without departing from the scope of the present disclosure, the indication information may also be referred to as the second information, and similarly, the second information may also be referred to as the indication information. Depending on the context, the word "if" as used herein can be interpreted as "upon" or "when" or "in response to determination."

With the continuous development of communication technology, the necessity of extending the PBCH (Physical Broadcast Channel) is becoming stronger and stronger. However, there is no technical solution for extending PBCH in the related art, which reduces the communication capability of PBCH.

In the first version of 5G (5th Generation, or the fifth-generation mobile communication technology) in the 3GPP (3rd Generation Partnership Project), effective information of a PBCH is only 32 bits. Considering the first version is relatively hasty, many subsequent extensions are not considered, so the extension of the PBCH is required. On the other hand, 3GPP also clearly stated that forward compatibility and backward compatibility should be considered to increase the practicability of the standard. Therefore, the extension of the PBCH cannot affect the compatibility of the network and the terminal.

In view of the above problems, the present disclosure proposes a method for extending a PBCH. In the method for extending a PBCH, a synchronous broadcast block of the PBCH is provided with a PBCH extension bit first, and then the extension of the PBCH is performed based on the PBCH extension bit. The PBCH extension bit may be one of the above-mentioned "only 32 bits of effective information of a PBCH."

In addition, when the extension of the PBCH is performed based on the PBCH extension bit, it can include, but not limited to, the following three situations.

The first situation is that the extension of the PBCH is required, and the sending of the PBCH extension information is required.

In this case, the base station can enable an indication function for the PBCH extension bit, when the extension of the PBCH is required. The PBCH extension bit is configured to indicate whether there is PBCH extension information. When the sending of the PBCH extension information is required, the base station may set the PBCH extension bit in a first synchronous broadcast block to be a first state, and the first state is configured to indicate that there is PBCH extension information. The base station sends the first synchronous broadcast block to a terminal, so that the terminal determines that there is the PBCH extension information according to the first state. A PBCH extension block is generated, and the PBCH extension block includes the PBCH extension information; and the PBCH extension block is sent at a set extension position, so that the terminal receives the PBCH extension block at the set extension position, and obtains the PBCH extension information from the PBCH extension block.

The second situation is that the extension of the PBCH is required, and the sending of the PBCH extension information is not required for the moment.

In this case, the base station can enable an indication function for the PBCH extension bit, when the extension of the PBCH is required. The PBCH extension bit is configured to indicate whether there is PBCH extension information. When the sending of the PBCH extension information is not required, the base station may set the PBCH extension bit in the second synchronous broadcast block to be a second state, and the second state is configured to indicate that there is no PBCH extension information, and the second synchronous broadcast block is sent to the terminal, so that the terminal determines that there is no PBCH extension information according to the second state.

The third situation is that the extension of the PBCH is not required.

In this case, the base station can disable the indication function for the PBCH extension bit when the extension of the PBCH is not required, and sets a PBCH extension bit in a third synchronous broadcast block to be a reserved state which is configured to indicate to ignore the PBCH extension bit; and sends the third synchronous broadcast block to the terminal, so that the terminal determines to ignore the PBCH extension bit according to the reserved state.

Therefore, the present disclosure implements the extension of the PBCH by setting the PBCH extension bit, thereby solving the compatibility problem of different terminals and improving the practicability of PBCH extension.

The following describes the technical solutions provided by the embodiments of the present disclosure with specific embodiments.

FIG. 1 is a flowchart showing a method for extending a PBCH according to an exemplary embodiment. The method for extending a PBCH can be used in a base station, and a synchronous broadcast block of the PBCH is provided with a PBCH extension bit. As shown in FIG. 1, the method for extending a PBCH includes the following steps 110-150.

In step 110, when the extension of the PBCH is required, an indication function for the PBCH extension bit is enabled, and the PBCH extension bit is configured to indicate whether there is PBCH extension information.

In the embodiment of the present disclosure, when the extension of the PBCH is required, the PBCH extension bit may be used to indicate whether there is PBCH extension information; when the extension of the PBCH is not required, the PBCH extension bit is a reserved bit and is not used to indicate whether there is PBCH extension information.

In step 120, when the sending of the PBCH extension information is required, the PBCH extension bit in a first synchronous broadcast block is set to be a first state, and the first state is configured to indicate that there is PBCH extension information.

In the embodiment of the present disclosure, the first state may be a predefined state, which is configured to indicate the PBCH extension information.

In an embodiment, the first state is an activated state, and the activated state is configured to indicate that there is the PBCH extension information.

In an embodiment, the first state is a first value, and the first value is configured to indicate that there is the PBCH extension information. For example, the first value is 1.

In step 130, the first synchronous broadcast block is sent to a terminal, so that the terminal determines that there is the PBCH extension information according to the first state.

In step 140, a PBCH extension block is generated, and the PBCH extension block includes PBCH extension information. There is no execution order between this step and the step 130. That is, the step 130 may be performed first, and then the step 140 is performed; or the step 140 may be performed first, and then the step 130 is performed; or the 130 and the step 140 may be performed simultaneously.

In the embodiment of the present disclosure, the PBCH extension block may be a predefined time-frequency resource block, and the time-frequency resource block is configured to carry the PBCH extension information.

In an embodiment, the synchronous broadcast block is a time-frequency resource block that carries a synchronous signal and broadcast information, and the PBCH extension block is a time-frequency resource block that does not carry the synchronous signal.

In step 150, the PBCH extension block is sent at the set extension position, so that the terminal receives the PBCH extension block at the set extension position, and obtains the PBCH extension information from the PBCH extension block.

In the embodiment of the present disclosure, the set extension position may be a predefined extension position, and both the base station and the terminal may know the set extension position in advance.

In an embodiment, the set extension position is a specified time domain position after the first synchronous broadcast block.

Figure 2A:
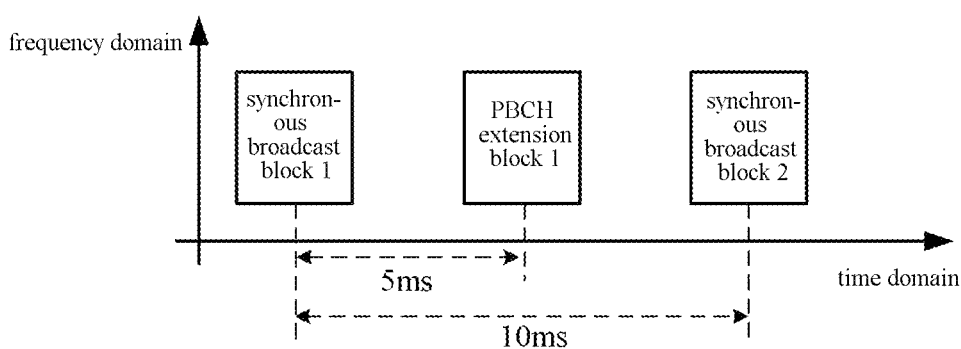
FIG. 2A is a schematic diagram showing setting an extension position according to an exemplary embodiment.

For example, as shown in FIG. 2A, the sending period of the synchronous broadcast block is 10 ms. If the synchronous broadcast block 1 is the first synchronous broadcast block, the time domain position where the PBCH extension block 1 after the synchronous broadcast block 1 is located may be the set extension position.

In an embodiment, the extension position is set to a specified frequency domain position after the first synchronous broadcast block.

Figure 2B:
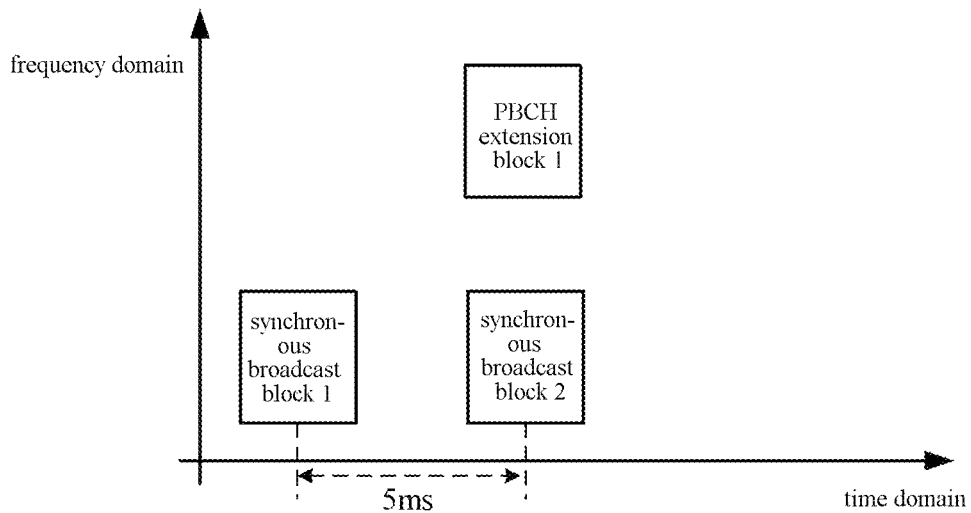
FIG. 2B is a schematic diagram showing another setting extension position according to an exemplary embodiment.

For example, as shown in FIG. 2B, the sending period of the synchronous broadcast block is 5 ms. If the synchronous broadcast block 1 is the first synchronous broadcast block, the frequency domain position where the PBCH extension block 1 after the synchronous broadcast block 1 is located may be the set extension position.

Figure 2C:
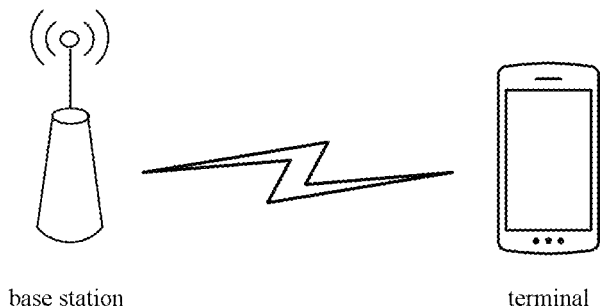
FIG. 2C is an application scenario diagram showing a method for extending a PBCH according to an exemplary embodiment.

In an application scenario of the embodiment, as shown in FIG. 2C, a base station and a terminal are included. The base station can enable an indication function for the PBCH extension bit, when the extension of the PBCH is required. The PBCH extension bit is configured to indicate whether there is PBCH extension information: (1) when the sending of the PBCH extension information is required, the base station may set the PBCH extension bit in a first synchronous broadcast block to be a first state, and the first state is configured to indicate that there is PBCH extension information. The base station sends the first synchronous broadcast block to a terminal, so that the terminal may determine that there is the PBCH extension information according to the first state. A PBCH extension block is generated, and the PBCH extension block includes the PBCH extension information; and the PBCH extension block is sent at a set extension position, so that the terminal may receive the PBCH extension block at the set extension position, and obtain the PBCH extension information from the PBCH extension block; (2) when the sending of the PBCH extension information is not required, the base station may set the PBCH extension bit in the second synchronous broadcast block to be a second state, and the second state is configured to indicate that there is no PBCH extension information, and the second synchronous broadcast block is sent to the terminal, so that the terminal may determine that there is no PBCH extension information according to the second state; (3) the base station can disable the indication function for the PBCH extension bit when the extension of the PBCH is not required, and set a PBCH extension bit in a third synchronous broadcast block to be a reserved state which is configured to indicate to ignore the PBCH extension bit; and send the third synchronous broadcast block to the terminal, so that the terminal may determine to ignore the PBCH extension bit according to the reserved state.

It can be seen from the above embodiments that when the extension of the PBCH is required, the indication function for the PBCH extension bit is enabled. The PBCH extension bit is used to indicate whether there is PBCH extension information. When the sending of the PBCH extension information is required, the base station may set the PBCH extension bit in the first synchronous broadcast block to be the first state which is configured to indicate that there is PBCH extension information, and send the first synchronous broadcast block to the terminal, so that the terminal may determine that there is the PBCH extension information according to the first state. The PBCH extension block is generated, and the PBCH extension block includes the PBCH extension information. The PBCH extension block is sent at the set extension position, so that the terminal may receive the PBCH extension block at the set extension position, and obtain the PBCH extension information from the PBCH extension block, thereby achieving the function of extending the PBCH and improving the communication capability of the extended PBCH.

Figure 3:
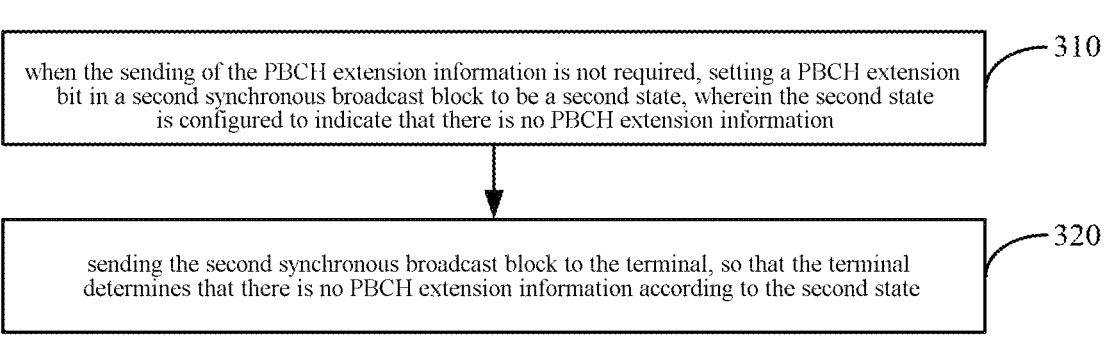
FIG. 3 is a flowchart showing another method for extending a PBCH according to an exemplary embodiment.

FIG. 3 is a flowchart showing another method for extending a PBCH according to an exemplary embodiment. The method for extending the PBCH may be used in the base station, and a synchronous broadcast block of the PBCH is provided with a PBCH extension bit. This method is established on the basis of the method shown in FIG. 1. As shown in FIG. 3, the method for extending the PBCH further includes the following steps 310-320.

In step 310, when the sending of the PBCH extension information is not required, a PBCH extension bit in a second synchronous broadcast block is set to be a second state, and the second state is configured to indicate that there is no PBCH extension information.

In the embodiment of the present disclosure, the second state may be a predefined state which is configured to indicate that there is no PBCH extension information.

In an embodiment, the second state is an inactive state, and the inactive state is configured to indicate that there is no PBCH extension information.

In an embodiment, the second state is a second value, and the second value is configured to indicate that there is no PBCH extension information. For example, the second value is 0.

In step 320, the second synchronous broadcast block is sent to the terminal, so that the terminal determines that there is no PBCH extension information according to the second state.

As can be seen from the foregoing embodiment, when the sending of the PBCH extension information is not required, the base station may set the PBCH extension bit in the second synchronous broadcast block to be a second state which is configured to indicate that there is no PBCH extension information, and send the second synchronous broadcast block to the terminal, so that the terminal can determine that there is no PBCH extension information according to the second state, thereby enriching the implementation manner of the extended PBCH and improving the practicability of the extended PBCH.

Figure 4:
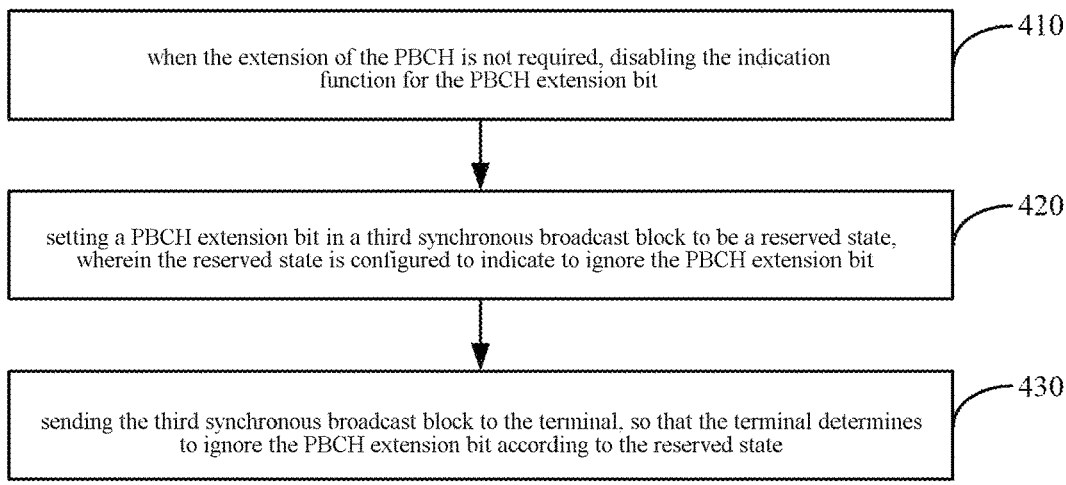
FIG. 4 is a flowchart showing another method for extending a PBCH according to an exemplary embodiment.

FIG. 4 is a flowchart showing another method for extending a PBCH according to an exemplary embodiment. The method for extending the PBCH may be used in the base station, and a synchronous broadcast block of the PBCH is provided with a PBCH extension bit. This method is established on the basis of the method shown in FIG. 1. As shown in FIG. 4, the method for extending the PBCH further includes the following steps 410-420.

In step 410, when the extension of the PBCH is not required, the indication function for the PBCH extension bit is disabled.

In step 420, the PBCH extension bit in the third synchronous broadcast block is set to a reserved state, and the reserved state is configured to indicate to ignore the PBCH extension bit.

In the embodiment of the present disclosure, the reserved state may be a predefined state which is configured to indicate to ignore the PBCH extension bit.

In step 430, the third synchronous broadcast block is sent to the terminal, so that the terminal determines to ignore the PBCH extension bit according to the reserved state.

It can be seen from the above embodiments that when the extension of the PBCH is not required, the base station may disable the indication function for the PBCH extension bit, and set the PBCH extension bit in the third synchronous broadcast block to be the reserved state which is configured to indicate to ignore the PBCH extension bit, and then send the third synchronous broadcast block to the terminal, so that the terminal may determine to ignore the PBCH extension bit according to the reserved state, thereby solving the compatibility problem of different terminals and improving the reliability of the extended PBCH.

Figure 5:
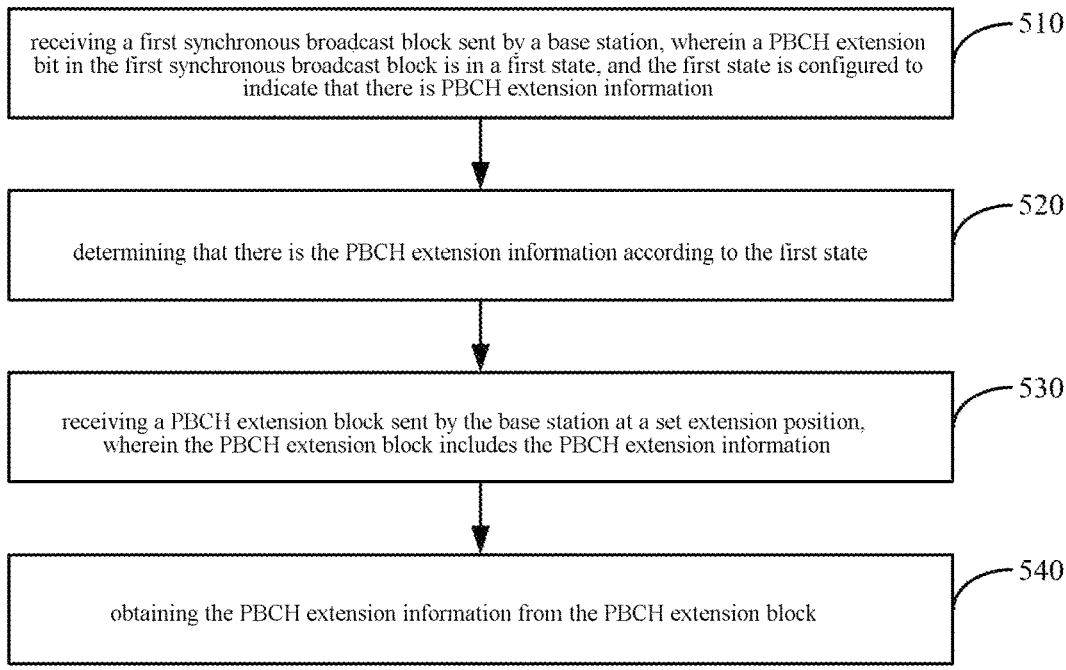
FIG. 5 is a flowchart showing a method for extending a PBCH according to an exemplary embodiment.

FIG. 5 is a flowchart showing a method for extending a PBCH according to an exemplary embodiment. The method for extending a PBCH may be used for a terminal, and a synchronous broadcast block of the PBCH is provided with a PBCH extension bit. As shown in FIG. 5, the method for extending a PBCH includes the following steps 510-530.

In step 510, a first synchronous broadcast block sent by a base station is received, and a PBCH extension bit in the first synchronous broadcast block is in a first state, and the first state is configured to indicate that there is PBCH extension information.

In the embodiment of the present disclosure, the first state may be a predefined state which is configured to indicate the PBCH extension information.

In an embodiment, the first state is an activated state, and the activated state is configured to indicate that there is the PBCH extension information.

In an embodiment, the first state is a first value, and the first value is configured to indicate that there is the PBCH extension information. For example, the first value is 1.

In step 520, it is determined that there is PBCH extension information according to the first state.

In step 530, the PBCH extension block sent by the base station is received at a set extension position, and the PBCH extension block includes the PBCH extension information.

In the embodiment of the present disclosure, the set extension position may be a predefined extension position, and both the base station and the terminal may know the set extension position in advance.

In an embodiment, the set extension position is a specified time domain position after the first synchronous broadcast block.

In this manner, when the terminal receives the PBCH extension block sent by the base station at the set extension position, it can receive the PBCH extension block sent by the base station at a specified time domain position after the first synchronous broadcast block.

In an embodiment, the set extension position is a specified frequency domain position after the first synchronous broadcast block.

In this manner, when the terminal receives the PBCH extension block sent by the base station at the set extension position, it can receive the PBCH extension block sent by the base station at a specified frequency domain position after the first synchronous broadcast block.

In an embodiment, the synchronous broadcast block may be a time-frequency resource block that carries a synchronous signal and broadcast information, and the PBCH extension block may be a time-frequency resource block that does not carry the synchronous signal.

In step 540, PBCH extension information is obtained from the PBCH extension block.

As can be seen from the foregoing embodiments, by receiving the first synchronous broadcast block sent by the base station, the PBCH extension bit in the first synchronous broadcast block being in the first state, and the first state being used to indicate that there is PBCH extension information, and determining that there is the PBCH extension information according to the first state and receiving a PBCH extension block sent by the base station at a set extension position, the PBCH extension block including the PBCH extension information, the function of extending the PBCH is realized, and the communication capability of the extended PBCH is improved.

Figure 6:
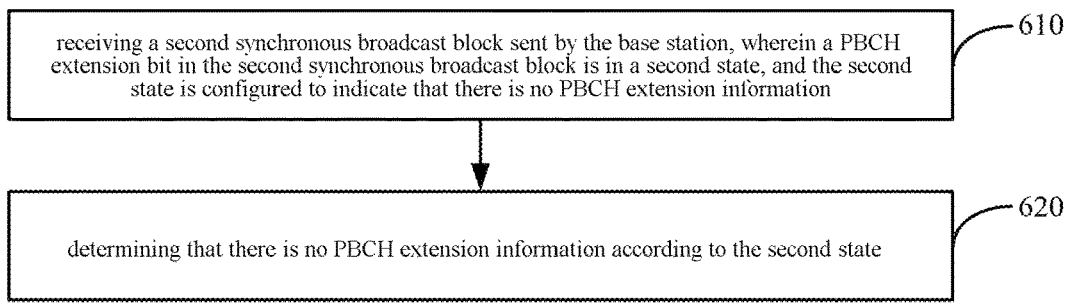
FIG. 6 is a flowchart showing another method for extending a PBCH according to an exemplary embodiment.

FIG. 6 is a flowchart showing another method for extending a PBCH according to an exemplary embodiment. The method for extending the PBCH may be used in the terminal, and a synchronous broadcast block of the PBCH is provided with a PBCH extension bit. This method is established on the basis of the method shown in FIG. 1. As shown in FIG. 6, the method for extending the PBCH further includes the following steps 610-620.

In step 610, a second synchronous broadcast block sent by the base station is received. The PBCH extension bit in the second synchronous broadcast block is in a second state, and the second state is configured to indicate that there is no PBCH extension information.

In the embodiment of the present disclosure, the second state may be a predefined state which is configured to indicate that there is no PBCH extension information.

In an embodiment, the second state is an inactive state, and the inactive state is configured to indicate that there is no PBCH extension information.

In an embodiment, the second state is a second value, and the second value is configured to indicate that there is no PBCH extension information. For example, the second value is 0.

In step 620, it is determined that there is no PBCH extension information according to the second state.

As can be seen from the foregoing embodiment, by receiving the second synchronous broadcast block sent by the base station, the PBCH extension bit in the second synchronous broadcast block being in a second state, and the second state being used to indicate that there is no PBCH extension information, and determining that there is no PBCH extension information according to the second state, the implementation manner of the extended PBCH is enriched, and the practicability of the extended PBCH is improved.

Figure 7:
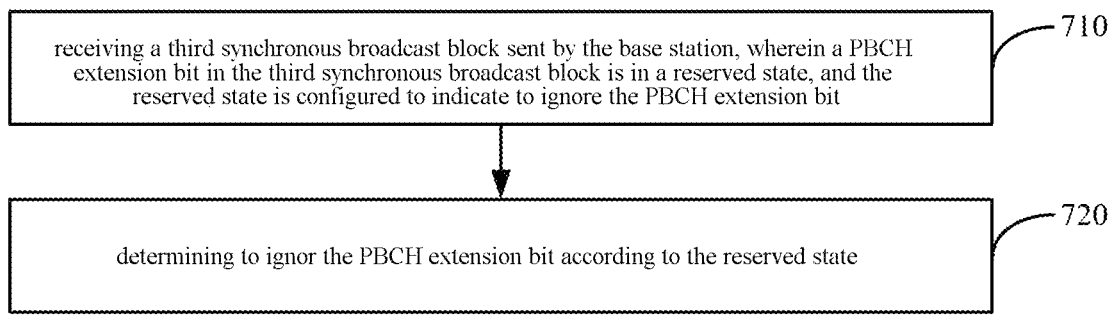
FIG. 7 is a flowchart showing another method for extending a PBCH according to an exemplary embodiment.

FIG. 7 is a flowchart showing another method for extending a PBCH according to an exemplary embodiment. The method for extending the PBCH may be used in the terminal, and a synchronous broadcast block of the PBCH is provided with a PBCH extension bit. This method is established on the basis of the method shown in FIG. 1. As shown in FIG. 6, the method for extending the PBCH further includes the following steps 710-720.

In step 710, a third synchronous broadcast block sent by the base station is received. The PBCH extension bit in the third synchronous broadcast block is in a reserved state, and the reserved state is configured to indicate to ignore the PBCH extension bit.

In the embodiment of the present disclosure, the reserved state may be a predefined state which is configured to indicate to ignore the PBCH extension bit.

In step 720, it is determined to ignore the PBCH extension bit according to the reserved state.

It can be seen from the foregoing embodiment that by receiving the third synchronous broadcast block sent by the base station, the PBCH extension bit in the third synchronous broadcast block being in a reserved state, and the reserved state being used to indicate to ignore the PBCH extension bit, and determining to ignore the PBCH extension bit according to the reserved state, the compatibility problem of different terminals is solved, and reliability of the extended PBCH is improved.

Corresponding to the foregoing embodiments of the method for extending the PBCH, the present disclosure also provides the embodiments of the device for extending the PBCH.

Figure 8:
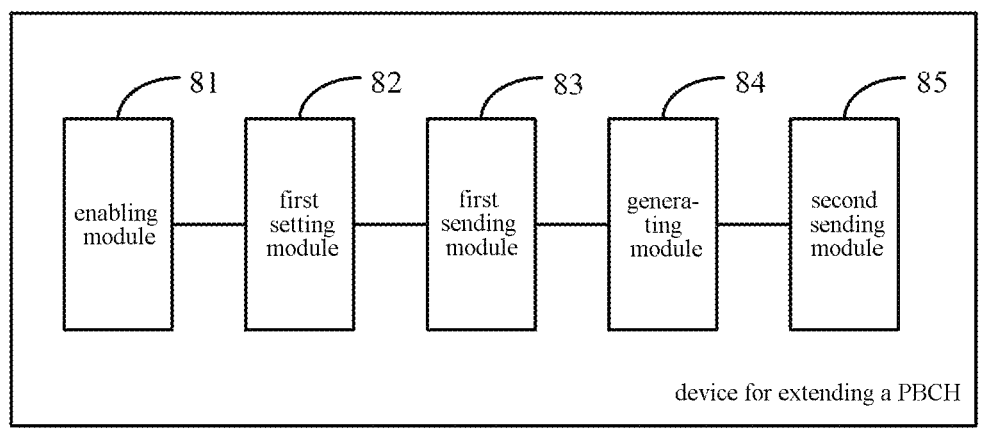
FIG. 8 is a flowchart showing a method for extending a PBCH according to an exemplary embodiment.

FIG. 8 is a block diagram showing a device for extending a PBCH according to an exemplary embodiment. The device is used for a base station, and a synchronous broadcast block of the PBCH is provided with a PBCH extension bit, and is used for performing the method for extending the PBCH shown in FIG. 1. As shown in FIG. 8, the device for extending PBCH may include:

an enabling module 81, configured to enable an indication function for the PBCH extension bit when extension of the PBCH is required, wherein the PBCH extension bit is configured to indicate whether there is PBCH extension information;

a first setting module 82, configured to set a PBCH extension bit in a first synchronous broadcast block to be a first state when sending of the PBCH extension information is required, wherein the first state is configured to indicate that there is PBCH extension information;

a first sending module 83, configured to send the first synchronous broadcast block to a terminal, so that the terminal determines that there is the PBCH extension information according to the first state;

a generating module 84, configured to generate a PBCH extension block, wherein the PBCH extension block includes the PBCH extension information; and a second sending module 85, configured to send the PBCH extension block at a set extension position, so that the terminal receives the PBCH extension block at the set extension position, and obtains the PBCH extension information from the PBCH extension block.

It can be seen from the above embodiments that when the extension of the PBCH is required, the indication function for the PBCH extension bit is enabled. The PBCH extension bit is configured to indicate whether there is PBCH extension information. When the sending of the PBCH extension information is required, the base station may set the PBCH extension bit in the first synchronous broadcast block to be the first state which is configured to indicate that there is PBCH extension information, and send the first synchronous broadcast block to the terminal, so that the terminal may determine that there is the PBCH extension information according to the first state. The PBCH extension block is generated, and the PBCH extension block includes the PBCH extension information. The PBCH extension block is sent at the set extension position, so that the terminal may receive the PBCH extension block at the set extension position, and obtain the PBCH extension information from the PBCH extension block, thereby achieving the function of extending the PBCH and improving the communication capability of the extended PBCH.

In an embodiment, on the basis of the device shown in FIG. 8, the first state is an activated state, and the activated state is configured to indicate that there is the PBCH extension information.

In an embodiment, on the basis of the device shown in FIG. 8, the first state is a first value, and the first value is configured to indicate that there is the PBCH extension information.

In an embodiment, on the basis of the device shown in FIG. 8, the synchronous broadcast block is a time-frequency resource block that carries a synchronous signal and broadcast information, and the PBCH extension block is a time-frequency resource block that does not carry the synchronous signal.

In an embodiment, on the basis of the device shown in FIG. 8, the set extension position is a specified time domain position after the first synchronous broadcast block.

In an embodiment, on the basis of the device shown in FIG. 8, the set extension position is a specified frequency domain position after the first synchronous broadcast block.

Figure 9:
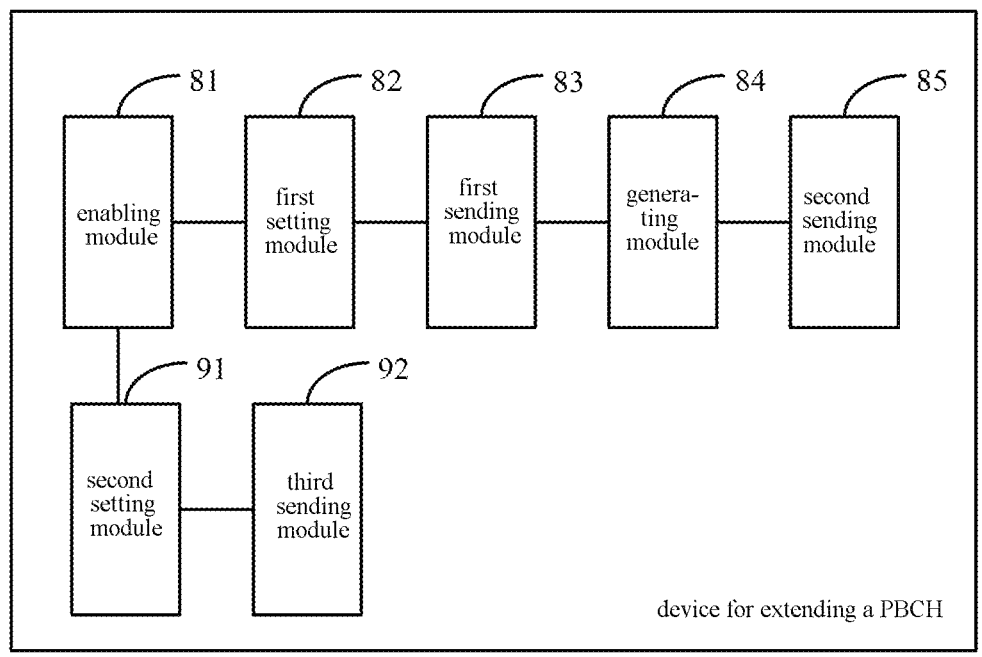
FIG. 9 is a block diagram showing another device for extending a PBCH according to an exemplary embodiment.

In an embodiment, based on the device shown in FIG. 8, as shown in FIG. 9, the device further includes:

a second setting module 91, configured to set a PBCH extension bit in a second synchronous broadcast block to be a second state when sending of the PBCH extension information is not required, wherein the second state is configured to indicate that there is no PBCH extension information;

a third sending module 92, configured to send the second synchronous broadcast block to the terminal, so that the terminal determines that there is no PBCH extension information according to the second state.

As can be seen from the foregoing embodiment, when the sending of the PBCH extension information is not required, the base station may set the PBCH extension bit in the second synchronous broadcast block to be a second state which is configured to indicate that there is no PBCH extension information, and send the second synchronous broadcast block to the terminal, so that the terminal can determine that there is no PBCH extension information according to the second state, thereby enriching the implementation manner of the extended PBCH and improving the practicability of the extended PBCH.

In an embodiment, on the basis of the device shown in FIG. 9, the second state is an inactive state, and the inactive state is configured to indicate that there is no PBCH extension information.

In an embodiment, on the basis of the device shown in FIG. 9, the second state is a second value, and the second value is configured to indicate that there is no PBCH extension information.

Figure 10:
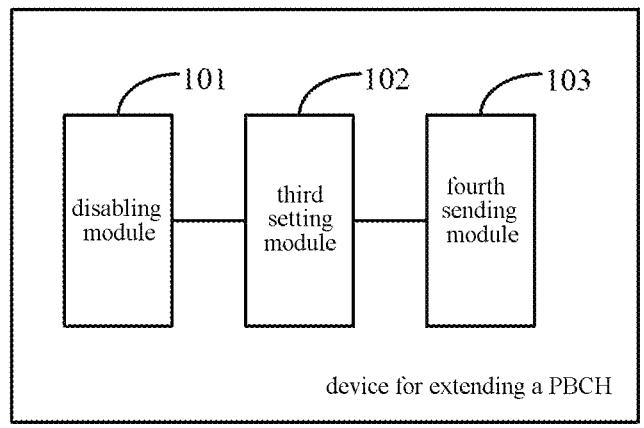
FIG. 10 is a block diagram showing another device for extending a PBCH according to an exemplary embodiment.

In an embodiment, based on the device described in FIG. 8, as shown in FIG. 10, the device further includes:

a disabling module 101, configured to disable the indication function for the PBCH extension bit, when the extension of the PBCH is not required;

a third setting module 102, configured to set a PBCH extension bit in a third synchronous broadcast block to be a reserved state, wherein the reserved state is configured to indicate to ignore the PBCH extension bit;

a fourth sending module 103, configured to send the third synchronous broadcast block to the terminal, so that the terminal determines to ignore the PBCH extension bit according to the reserved state.

It can be seen from the above embodiments that when the extension of the PBCH is not required, the base station may disable the indication function for the PBCH extension bit, and set the PBCH extension bit in the third synchronous broadcast block to be the reserved state which is configured to indicate to ignore the PBCH extension bit, and then send the third synchronous broadcast block to the terminal, so that the terminal may determine to ignore the PBCH extension bit according to the reserved state, thereby solving the compatibility problem of different terminals and improving the reliability of the extended PBCH.

Figure 11:
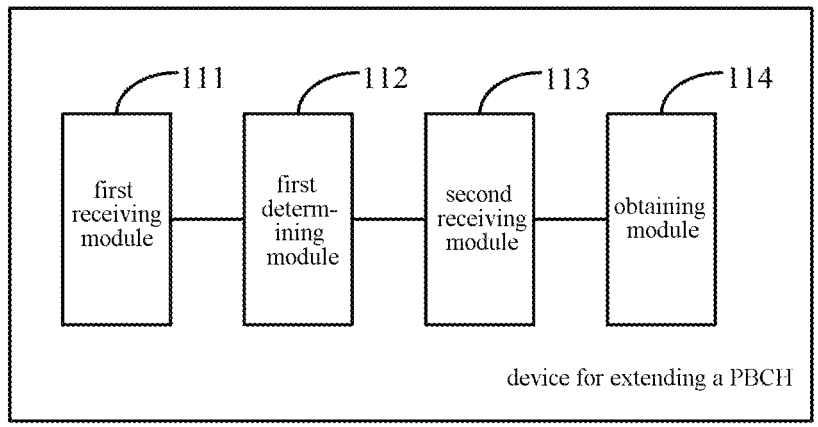
FIG. 11 is a block diagram showing a device for extending a PBCH according to an exemplary embodiment.

FIG. 11 is a block diagram showing a device for extending a PBCH according to an exemplary embodiment. The device is used for a terminal, and a synchronous broadcast block of the PBCH is provided with a PBCH extension bit, and is configured to perform the method for extending the PBCH shown in FIG. 5. As shown in FIG. 11, the device for extending the PBCH may include:

a first receiving module 111, configured to receive a first synchronous broadcast block sent by a base station, wherein a PBCH extension bit in the first synchronous broadcast block is in a first state, and the first state is configured to indicate that there is PBCH extension information;

a first determining module 112, configured to determine that there is the PBCH extension information according to the first state;

a second receiving module 113, configured to receive a PBCH extension block sent by the base station at a set extension position, wherein the PBCH extension block includes the PBCH extension information;

an obtaining module 114, configured to obtain the PBCH extension information from the PBCH extension block.

As can be seen from the foregoing embodiments, by receiving the first synchronous broadcast block sent by the base station, the PBCH extension bit in the first synchronous broadcast block being in the first state, and the first state being used to indicate that there is PBCH extension information, and determining that there is the PBCH extension information according to the first state and receiving a PBCH extension block sent by the base station at a set extension position, the PBCH extension block including the PBCH extension information, the function of extending the PBCH is realized, and the communication capability of the extended PBCH is improved.

In an embodiment, on the basis of the device shown in FIG. 11, the first state is an activated state, and the activated state is configured to indicate that there is the PBCH extension information.

In an embodiment, on the basis of the device shown in FIG. 11, the first state is a first value, and the first value is configured to indicate that there is the PBCH extension information.

Figure 12:
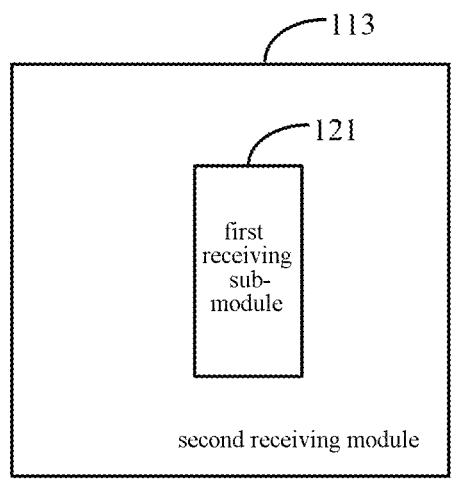
FIG. 12 is a block diagram showing another device for extending a PBCH according to an exemplary embodiment.

In an embodiment, on the basis of the device shown in FIG. 11, the set extension position is a specified time domain position after the first synchronous broadcast block; as shown in FIG. 12, the second receiving module 113 includes:

a first receiving sub-module 121, configured to receive the PBCH extension block sent by the base station at the specified time domain position.

Figure 13:
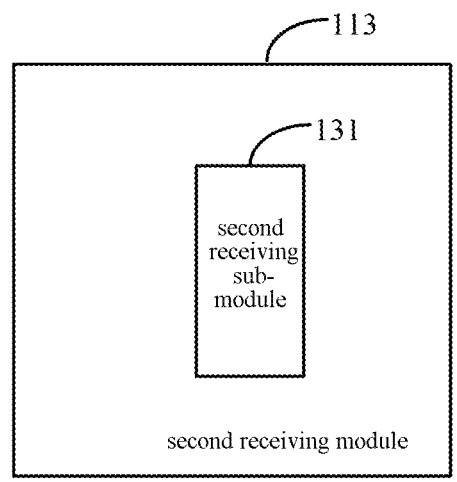
FIG. 13 is a block diagram showing another device for extending a PBCH according to an exemplary embodiment.

In an embodiment, on the basis of the device shown in FIG. 11, the set extension position is a specified frequency domain position after the first synchronous broadcast block; as shown in FIG. 13, the second receiving module 113 may include:

a second receiving sub-module 131, configured to receive the PBCH extension block sent by the base station at the specified frequency domain position.

In an embodiment, on the basis of the device shown in FIG. 11, the synchronous broadcast block is a time-frequency resource block that carries a synchronous signal and broadcast information, and the PBCH extension block is a time-frequency resource block that does not carry the synchronous signal.

Figure 14:
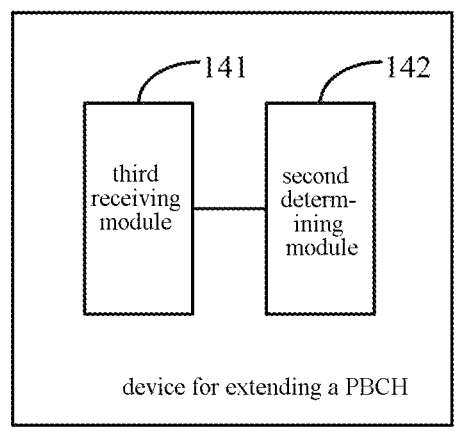
FIG. 14 is a block diagram showing another device for extending a PBCH according to an exemplary embodiment.

In an embodiment, based on the device described in FIG. 11, as shown in FIG. 14, the device may further include:

a third receiving module 141, configured to receive a second synchronous broadcast block sent by the base station, wherein a PBCH extension bit in the second synchronous broadcast block is in a second state, and the second state is configured to indicate that there is no PBCH extension information; and a second determining module 142, configured to determine that there is no PBCH extension information according to the second state.

As can be seen from the foregoing embodiment, by receiving the second synchronous broadcast block sent by the base station, the PBCH extension bit in the second synchronous broadcast block being in a second state, and the second state being used to indicate that there is no PBCH extension information, and determining that there is no PBCH extension information according to the second state, the implementation manner of the extended PBCH is enriched, and the practicability of the extended PBCH is improved.

In an embodiment, on the basis of the device shown in FIG. 14, the second state is an inactive state, and the inactive state is configured to indicate that there is no PBCH extension information.

In an embodiment, on the basis of the device shown in FIG. 14, the second state is a second value, and the second value is configured to indicate that there is no PBCH extension information.

Figure 15:
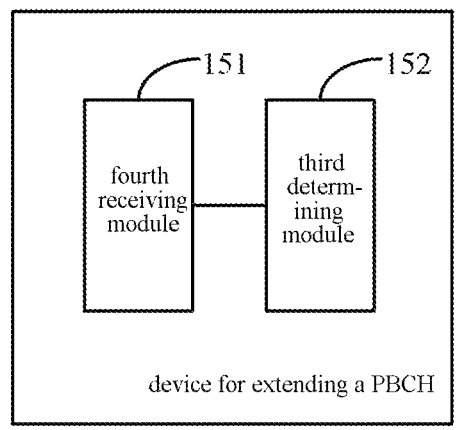
FIG. 15 is a block diagram showing another device for extending a PBCH according to an exemplary embodiment.

In an embodiment, based on the device shown in FIG. 11, as shown in FIG. 15, the device may further include:

a fourth receiving module 151, configured to receive a third synchronous broadcast block sent by the base station, wherein a PBCH extension bit in the third synchronous broadcast block is in a reserved state, and the reserved state is configured to indicate to ignore the PBCH extension bit; and a third determining module 152, configured to determine to ignore the PBCH extension bit according to the reserved state.

It can be seen from the foregoing embodiment that by receiving the third synchronous broadcast block sent by the base station, the PBCH extension bit in the third synchronous broadcast block being in a reserved state, and the reserved state being used to indicate to ignore the PBCH extension bit, and determining to ignore the PBCH extension bit according to the reserved state, the compatibility problem of different terminals is solved, and reliability of the extended PBCH is improved.

As for the device embodiment, since it basically corresponds to the method embodiment, the relevant parts may refer to the description of the method embodiment. The device embodiments described above are only exemplary, in which the units described as separate components may or may not be physically separated, and the components shown as units may or may not be physical units, that is, may be located in one place, or can be distributed across multiple network units. Some or all of the modules can be selected according to actual needs to achieve the objectives of the solution of the present disclosure. Those of ordinary skill in the art can understand and implement the present disclosure without creative efforts.

The present disclosure also provides a non-transitory computer-readable storage medium on which a computer program is stored. The computer program is configured to execute the method for extending a PBCH according to any one of FIG. 1 to FIG. 4 described above.

The present disclosure also provides a non-transitory computer-readable storage medium on which a computer program is stored. The computer program is configured to execute the method for extending a PBCH according to any one of FIG. 5 to FIG. 7 described above.

The present disclosure also provides a device for extending a PBCH. The device is used for a base station, and a synchronous broadcast block of the PBCH is provided with a PBCH extension bit. The device includes:

a processor;

a memory for storing processor-executable instructions;

wherein the processor is configured to:

when extension of the PBCH is required, enable an indication function for the PBCH extension bit, wherein the PBCH extension bit is configured to indicate whether there is PBCH extension information;

when sending of the PBCH extension information is required, set a PBCH extension bit in a first synchronous broadcast block to be a first state, wherein the first state is configured to indicate that there is PBCH extension information;

send the first synchronous broadcast block to a terminal, so that the terminal determines that there is the PBCH extension information according to the first state;

generate a PBCH extension block, wherein the PBCH extension block includes the PBCH extension information; and send the PBCH extension block at a set extension position, so that the terminal receives the PBCH extension block at the set extension position, and obtains the PBCH extension information from the PBCH extension block.

Figure 16:
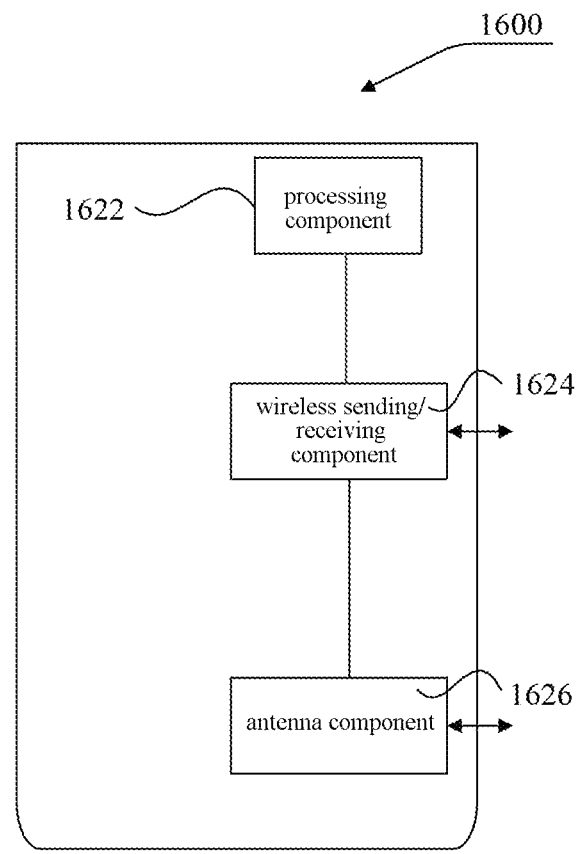
FIG. 16 is a schematic structural diagram showing a device for extending a PBCH according to an exemplary embodiment.

As shown in FIG. 16, FIG. 16 is a schematic structural diagram showing a device for extending a PBCH according to an exemplary embodiment. The device 1600 may be provided as a base station. Referring to FIG. 16, the device 1600 includes a processing component 1622, a wireless sending/receiving component 1624, an antenna component 1626, and a signal processing part specific to the wireless interface. The processing component 1622 may further include one or more processors.

One of the processors in the processing component 1622 can be configured to perform any one of the methods for extending a PBCH described above.

The present disclosure also provides a device for extending a PBCH. The device is used for a terminal, and a synchronous broadcast block of the PBCH is provided with a PBCH extension bit. The device includes:

a processor;

a memory for storing processor-executable instructions;

wherein the processor is configured to:

receive a first synchronous broadcast block sent by a base station, wherein a PBCH extension bit in the first synchronous broadcast block is in a first state, and the first state is configured to indicate that there is PBCH extension information;

determine that there is the PBCH extension information according to the first state;

receive a PBCH extension block sent by the base station at a set extension position, wherein the PBCH extension block includes the PBCH extension information; and obtain the PBCH extension information from the PBCH extension block.

Figure 17:
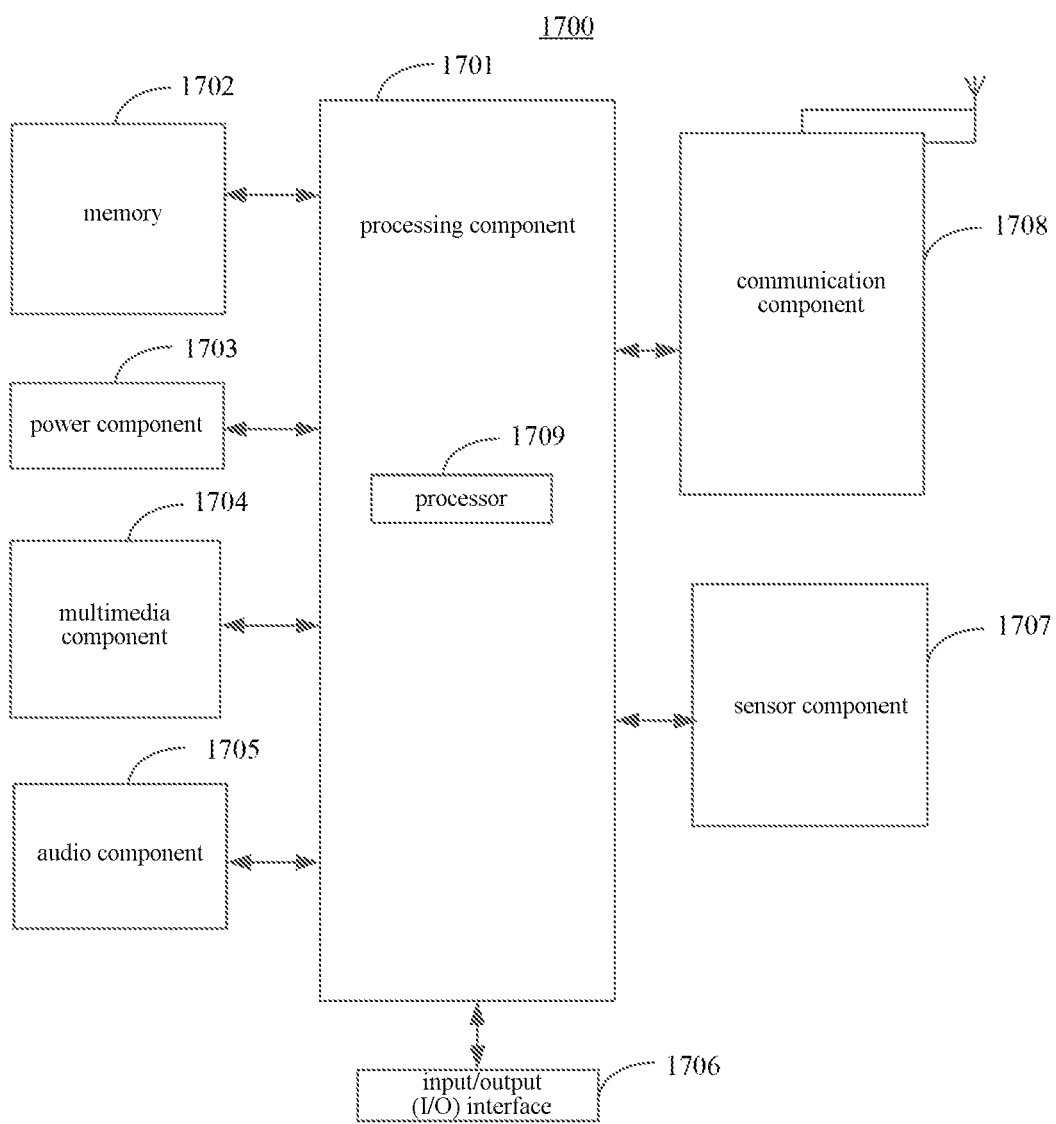
FIG. 17 is a schematic structural diagram showing a device for extending a PBCH according to an exemplary embodiment.

FIG. 17 is a schematic structural diagram of a device for extending a PBCH according to an exemplary embodiment. As shown in FIG. 17, according to an exemplary embodiment, a device 1700 for extending a PBCH is shown. The device 1700 may be a computer, a mobile phone, a digital broadcasting terminal, a messaging device, a game console, a tablet device, a medical device, fitness equipment, personal digital assistants and other terminals.

Referring to FIG. 17, the device 1700 may include one or more of the following components: a processing component 1701, a memory 1702, a power component 1703, a multimedia component 1704, an audio component 1705, an input/output (I/O) interface 1706, a sensor component 1707, and a communication component 1708.

The processing component 1701 typically controls the overall operations of the device 1700, such as the operations associated with display, telephone calls, data communications, camera operations, and recording operations. The processing component 1701 can include one or more processors 1709 to execute instructions to perform all or part of the steps in the above described methods. Moreover, the processing component 1701 can include one or more modules to facilitate the interaction between the processing component 1701 and other components. For example, the processing component 1701 can include a multimedia module to facilitate the interaction between the multimedia component 1704 and the processing component 1701.

The memory 1702 is configured to store various types of data to support the operation of the device 1700. Examples of such data include instructions for any application or method operated on device 1700, such as the contact data, the phone book data, messages, pictures, videos, and the like. The memory 1702 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1703 provides power to various components of the device 1700. The power component 1703 can include a power management system, one or more power sources, and other components associated with the generation, management, and distribution of power in the device 1700.

The multimedia component 1704 includes a screen providing an output interface between the device 1700 and the user t. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1704 includes a front camera and/or a rear camera. When the device 1700 is in an operation mode, such as a photographing mode or a video mode, the front camera and/or the rear camera can receive external multimedia datum. Each of the front camera and the rear camera may be a fixed optical lens system or have focus and optical zoom capability.

The audio component 1705 is configured to output and/or input an audio signal. For example, the audio component 1705 includes a microphone (MIC) configured to receive an external audio signal when the device 1700 is in an operation mode, such as a call mode, a recording mode, and a voice recognition mode. The received audio signal may be further stored in the memory 1702 or sent via the communication component 1708. In some embodiments, the audio component 1705 also includes a speaker for outputting the audio signal.

The I/O interface 1706 provides an interface between the processing component 1701 and peripheral interface modules, such as a keyboard, a click wheel, buttons, and the like. These buttons may include, but are not limited to, a home button, a volume button, a starting button, and a locking button.

The sensor component 1707 includes one or more sensors for providing status assessments of various aspects of the device 1700. For example, the sensor component 1707 can detect an open/closed status of the device 1700, relative positioning of components, such as the display and the keypad of the device 1700. The sensor component 1707 can also detect a change in position of one component of the device 1700 or the device 1700, the presence or absence of user contact with the device 1700, an orientation, or an acceleration/deceleration of the device 1700, and a change in temperature of the device 1700. The sensor component 1707 can include a proximity sensor configured to detect the presence of nearby objects without any physical contact. The sensor component 1707 can also include a light sensor, such as a CMOS or CCD image sensor, configured to use in imaging applications. In some embodiments, the sensor component 1707 can also include an accelerometer sensor, a gyroscope sensor, a magnetic sensor, a pressure sensor, or a temperature sensor.

The communication component 1708 is configured to facilitate wired or wireless communication between the device 1700 and other devices. The device 1700 can access a wireless network based on a communication standard, such as Wi-Fi, 2G or 3G, or a combination thereof. In an exemplary embodiment, the communication component 1708 receives broadcast signals or broadcast associated information from an external broadcast management system via a broadcast channel. In an exemplary embodiment, the communication component 1708 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an exemplary embodiment, the device 1700 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the above methods.

In an exemplary embodiment, there is also provided a non-transitory computer-readable storage medium including instructions, such as a memory 1702 including instructions executable by the processor 1709 of the device 1700 to perform the above described method. For example, the non-transitory computer readable storage medium may be a ROM, a random-access memory (RAM), a CD-ROM, a magnetic tape, a floppy disc, and an optical data storage device.

When the instructions in the storage medium are executed by the processor, the device 1700 can execute any one of the methods for extending a PBCH described above.

In some embodiments, a communication system is provided implementing the method described above, including a base station and the terminal, wherein the base station is configured to enable the indication function for the PBCH extension bit when the extension of the PBCH is required, and the PBCH extension bit is configured to indicate whether there is PBCH extension information; when the sending of the PBCH extension information is required, the base station sets the PBCH extension bit in the first synchronous broadcast block to be the first state which is configured to indicate that there is PBCH extension information, and sends the first synchronous broadcast block to the terminal, to facilitate the terminal determining that there is the PBCH extension information according to the first state; the PBCH extension block includes the PBCH extension information; the PBCH extension block is sent at the set extension position, to facilitate the terminal receiving the PBCH extension block at the set extension position, and obtaining the PBCH extension information from the PBCH extension block; the terminal is configured to receive the first synchronous broadcast block sent by the base station; the PBCH extension bit in the first synchronous broadcast block is in the first state, and the first state is configured to indicate that there is the PBCH extension information; the terminal is configured to determine that there is the PBCH extension information according to the first state, and receive the PBCH extension block sent by the base station at the set extension position; and the PBCH extension block includes the PBCH extension information, thereby extending the PBCH and improving communication capability of the extended PBCH.

It should be understood that the present disclosure is not limited to the precise structures that have been described above and shown in the drawings, and various modifications and changes can be made without departing from the scope thereof. The scope of the present disclosure is limited only by the appended claims.

The invention claimed is:

1. A method for extending a physical broadcast channel (PBCH), wherein a synchronous broadcast block of the PBCH is provided with a PBCH extension bit, and the method comprises:
enabling an indication function for the PBCH extension bit when extension of the PBCH is required, wherein the PBCH extension bit is configured to indicate whether there is PBCH extension information;
setting the PBCH extension bit in a first synchronous broadcast block to be a first state when sending of the PBCH extension information is required, wherein the first state is configured to indicate that there is PBCH extension information;
sending the first synchronous broadcast block to a terminal, so that the terminal determines that there is the PBCH extension information according to the first state;
generating a PBCH extension block, wherein the PBCH extension block comprises the PBCH extension information; and
sending the PBCH extension block at a set extension position, so that the terminal receives the PBCH extension block at the set extension position, and obtains the PBCH extension information from the PBCH extension block,
wherein the method further comprises:
disabling the indication function of the PBCH extension bit when the extension of the PBCH is not required;
setting the PBCH extension bit in a third synchronous broadcast block to be a reserved state, wherein the reserved state is configured to indicate to ignore the PBCH extension bit; and
sending the third synchronous broadcast block to the terminal, so that the terminal determines to ignore the PBCH extension bit according to the reserved state.

2. The method according to claim 1, wherein the first state is an activated state or a first value, the activated state is configured to indicate that there is the PBCH extension information, and the first value is configured to indicate that there is the PBCH extension information.

3. The method according to claim 1, wherein the synchronous broadcast block is a time-frequency resource block carrying a synchronous signal and broadcast information, and the PBCH extension block is a time-frequency resource block not carrying the synchronous signal.

4. The method according to claim 1, wherein the set extension position is a specified time domain position after the first synchronous broadcast block, or a specified frequency domain position after the first synchronous broadcast block.

5. The method according to claim 1, further comprising:
setting the PBCH extension bit in a second synchronous broadcast block to be a second state when the sending of the PBCH extension information is not required, wherein the second state is configured to indicate that there is no PBCH extension information; and
sending the second synchronous broadcast block to the terminal, so that the terminal determines that there is no PBCH extension information according to the second state.

6. The method according to claim 5, wherein the second state is an inactive state or a second value, the inactive state is configured to indicate that there is no PBCH extension information, and the second value configured to indicate that there is no PBCH extension information.

7. A method for extending a physical broadcast channel (PBCH), wherein a synchronous broadcast block of the PBCH is provided with a PBCH extension bit, and the method comprises:
receiving a first synchronous broadcast block sent by a base station, wherein—the PBCH extension bit in the first synchronous broadcast block is in a first state, and the first state is configured to indicate that there is PBCH extension information;
determining that there is the PBCH extension information according to the first state;

receiving a PBCH extension block sent by the base station at a set extension position, wherein the PBCH extension block comprises the PBCH extension information; and obtaining the PBCH extension information from the PBCH extension block, wherein the method further comprises:

receiving a third synchronous broadcast block sent by the base station, wherein the PBCH extension bit in the third synchronous broadcast block is in a reserved state, and the reserved state is configured to indicate to ignore the PBCH extension bit; and ignoring the PBCH extension bit according to the reserved state.

8. The method according to claim 7, wherein the first state is an activated state or a first value, the activated state is configured to indicate that there is the PBCH extension information, and the first value is configured to indicate that there is the PBCH extension information.

9. The method according to claim 7, wherein the set extension position is a specified time domain position after the first synchronous broadcast block;

receiving the PBCH extension block sent by the base station at a set extension position comprises:

receiving the PBCH extension block sent by the base station at the specified time domain position.

10. The method according to claim 7, wherein the set extension position is a specified frequency domain position after the first synchronous broadcast block;

receiving the PBCH extension block sent by the base station at a set extension position comprises:

receiving the PBCH extension block sent by the base station at the specified frequency domain position.

11. The method according to claim 7, wherein the synchronous broadcast block is a time-frequency resource block carrying a synchronous signal and broadcast information, and the PBCH extension block is a time-frequency resource block not carrying the synchronous signal.

12. The method according to claim 7, further comprising:

receiving a second synchronous broadcast block sent by the base station, wherein the PBCH extension bit in the second synchronous broadcast block is in a second state, and the second state is configured to indicate that there is no PBCH extension information; and determining that there is no PBCH extension information according to the second state.

13. The method according to claim 12, wherein the second state is an inactive state or a second value, the inactive state is configured to indicate that there is no PBCH extension information, and the second value is configured to indicate that there is no PBCH extension information.

14. A device for extending a physical broadcast channel (PBCH), wherein the device is used for a terminal, and a synchronous broadcast block of the PBCH is provided with a PBCH extension bit, and the device comprises:

a processor;

memory storing processor-executable instructions;

wherein the processor is configured to:

receive a first synchronous broadcast block sent by a base station, wherein the PBCH extension bit in the first synchronous broadcast block is in a first state, and the first state is configured to indicate that there is PBCH extension information;

determine that there is the PBCH extension information according to the first state;

receive a PBCH extension block sent by the base station at a set extension position, wherein the PBCH extension block comprises the PBCH extension information; and obtain the PBCH extension information from the PBCH extension block, wherein the the processor is further configured to:

receive a third synchronous broadcast block sent by the base station, wherein the PBCH extension bit in the third synchronous broadcast block is in a reserved state, and the reserved state is configured to indicate to ignore the PBCH extension bit; and ignore the PBCH extension bit according to the reserved state.

15. The device according to claim 14, wherein the first state is an activated state or a first value, the activated state is configured to indicate that there is the PBCH extension information, the first value configured to indicate that there is the PBCH extension information.

16. The device according to claim 14, the processor is further configured to:

receive a second synchronous broadcast block sent by the base station, wherein a PBCH extension bit in the second synchronous broadcast block is in a second state, and the second state is configured to indicate that there is no PBCH extension information; and determine that there is no PBCH extension information according to the second state.

17. The device according to claim 16, wherein the second state is an inactive state or a second value, the inactive state is configured to indicate that there is no PBCH extension information, and the second value is configured to indicate that there is no PBCH extension information.

* * * * *